April 27, 1965  P. A. AKIN  3,181,170
OPTICAL DISPLAY DEVICE
Filed July 25, 1963  4 Sheets-Sheet 1

INVENTOR.
PHILLIP A. AKIN
BY
Edward A. Sokolski
ATTORNEY

INVENTOR.
PHILLIP A. AKIN

INVENTOR.
PHILLIP A. AKIN

INVENTOR.
PHILLIP A. AKIN

United States Patent Office 3,181,170
Patented Apr. 27, 1965

3,181,170
OPTICAL DISPLAY DEVICE
Phillip A. Akin, Hermosa Beach, Calif., assignor to Northrop Corporation, Beverly Hills, Calif., a corporation of California
Filed July 25, 1963, Ser. No. 297,603
12 Claims. (Cl. 346—108)

This invention relates to an optical display device and more particularly to such a device in which the information to be displayed is scribed on a plate by means of a concentrated beam of energy.

The outputs of data processing and computing equipment which may represent graphic or alpha numeric information are generally read out on a display device. Page printers are often used for high speed alpha numeric display. Such printer devices however are slow and inaccurate for graphic display and do not provide color flexibility. Displays using cathode ray tubes while capable of generating either graphic or alpha numeric displays at high speeds lack the ability to provide large scale multi-color displays which are required for most command and control systems. Photographic display techniques while they can handle high speed data and provide large scale multi-colored displays require film processing before display with the time delay inherent therein. Electro-mechanical displays provide large scale multi-color displays of graphic and alpha numeric data but they are only capable of handling data at a low speed rate.

The device of this invention overcomes the shortcomings of prior art devices in providing a display device capable of handling high speed information and producing a large scale multi-color display. High definition is achieved and readout is accomplished in speeds comparable to those of the data source.

This end result is achieved by scribing the information received from the data source on an image plate having an opaque coating thereon by means of an intense concentrated energy beam in the frequency range of ultraviolet through infra red which may be generated in a device such as a laser. This beam is effectively positioned in accordance with the information received from the data source. The highly concentrated energy in the beam, deflected in accordance with the information from the data source, vaporizes the coating where it impinges thereon and thus scribes such information on the image plate. Several differently colored images can be simultaneously scribed on the same plate by utilizing several different coating layers on such plate. The image plate may be utilized in projecting a large scale display either as it is being scribed or subsequent to such scribing.

It is therefore an object of this invention to provide an improved display device.

It is a further object of this invention to provide a display device capable of handling high speed information of both the graphic and alpha numeric type and displaying such information at high speeds.

It is still another object of this invention to provide an optical display device capable of producing a multicolored display.

It is still a further object of this invention to provide an optical display device which utilizes a laser beam which is deflected in accordance with the information to be displayed and etches such information on an image plate by vaporizing an opaque coating thereon.

Other objects of this invention will become apparent from the following description taken in connection with the accompanying drawings of which FIG. 1 is a block diagram illustrating the basic operation of a preferred embodiment of the device of the invention;

Figure 1:
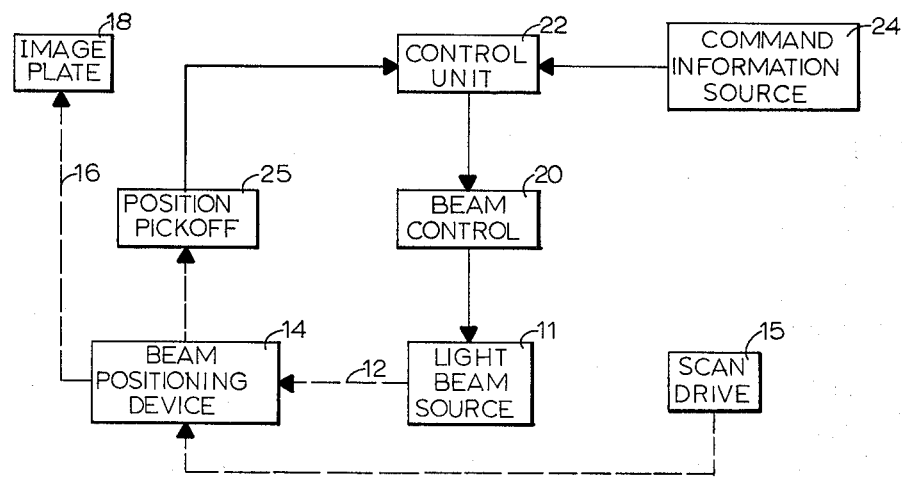

Referring now to FIG. 1, a block diagram illustrating the basic operation of a preferred embodiment of the device of the invention is shown. Beam source 11 generates a concentrated high intensity energy beam 12 in the frequency range from ultra violet through infra red. Beam source 11 may, for example, comprise a laser. Energy beam 12 impinges on beam positioning device 14. Beam positioning device 14 is driven at a regular scan rate by means of scan drive 15. Beam positioning device 14 may comprise, for example, an optical mirror or prism system. The deflected beam 16 impinges on image plate 18 at a point thereon which is in accordance with the scan position of beam positioning device 14 as determined by scan drive 15.

Light beam source 11 is controlled by beam control 20 and has an output only when beam control 20 so dictates. Information is fed to control unit 22 from command information source 24 and position pickoff 25. Position pickoff 25 has an output which is in accordance with the scan position of beam positioning device 14. The output of command information source 24 represents the information to be displayed. When the outputs of command information source 24 and position pickoff 25 are equal, control unit 22, which compares these two signals, feeds an output signal to beam control 20 which causes beam control 20 to turn on beam source 11. At such times, and only under such conditions, light beam 16 impinges on image plate 18.

As to be explained further in this specification, image plate 18 is coated with a material preferably having a relatively low heat and temperature of vaporization, and the material at the point of impingement of beam 16, vaporizes. Thus, an image is scribed on plate 18 when the deflected position of beam 16 corresponds to the command signal. For each scan cycle of beam positioning device 14, a position will be reached as indicated by position pickoff 25 which will coincide with the signal arriving from command information source 24 at that moment. At this instant, beam 16 will appear and effectively scribe the image plate.

Figure 2:
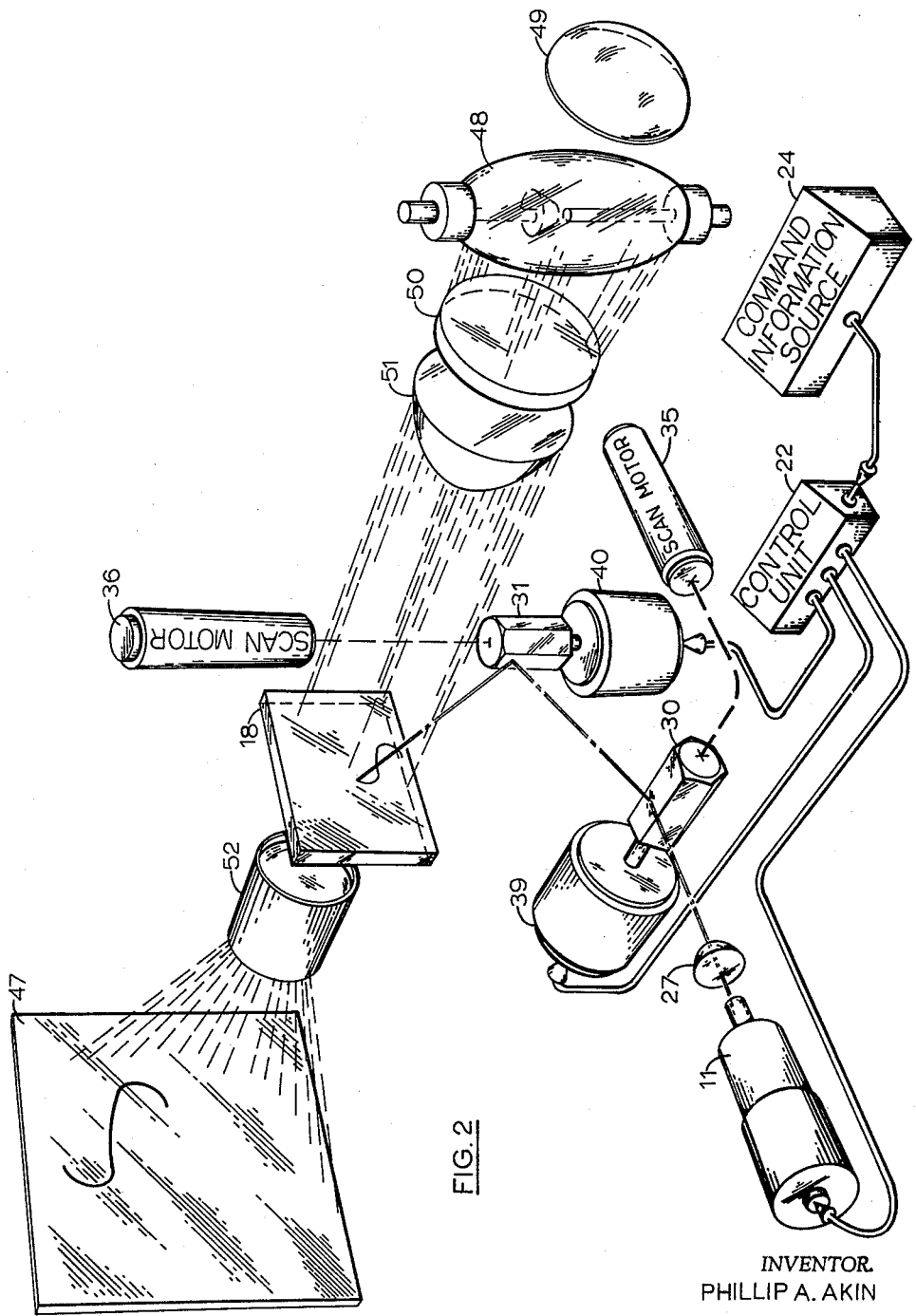
FIG. 2 is a schematic drawing illustrating a first embodiment of the device of the invention.

Referring now to FIG. 2 a first embodiment of the device of the invention is illustrated. Concentrated pulses of light energy are generated by pulsing laser 25. A laser as is well known in the art is capable of generating a monochromatic, coherent, highly directional and highly intense narrow light beam. Pulsing laser devices which may be utilized in the device of the invention are available commercially from various sources among them being the Raytheon Company, Waltham, Massachusetts.

The output of laser 25 is focused by means of lens 27 and the beam is reflected by means of horizontal optical mirror 30. The beam is reflected so that it impinges on vertical mirror 31 and thence reflected onto image plate 32.

Mirrors 30 and 31 are driven at a regular scan rate by means of motors 35 and 36 respectively. A typical scan rate for these mirrors, for example, may be of the order of 3,000 r.p.m. for one and 300 r.p.m. for the other. The exact angular positions of mirrors 30 and 31 at any instant are indicated by position pickoffs 39 and 40 respectively. The outputs of position pickoffs 39 and 40 are fed to control unit 22. Command signals from command information source 24 are also fed to the control unit.

Control unit 22 controls the pulsing of laser 11. At the instant that the position pickoffs 39 and 40 have outputs indicating coincidence with the output of the command information source 24, a control signal is fed from the control unit 22 to feed a pumping light pulse to laser 11. At this instant, therefore, a beam will be generated by the laser which will impinge upon the surface of image plate 18 to scribe the plate at the appropriate spot thereon corresponding to the input command.

In this fashion, either graphic or alpha numeric information generated by command information source 24 may be instantaneously scribed on plate 18. In view of the fineness of the output beam of the laser, the scribing line is extremely sharp and a considerable amount of information can be precisely scribed on a relatively small surface area.

The information scribed on plate 18 can be displayed on a screen 47 either as it is being scribed on the plate or subsequent thereto. Such a display may be achieved by a conventional optical system including projector lamp 48, reflector 49 and the lens system including lenses 50, 51 and 52.

For optimum results, plate 18 should be coated with a material having a relatively low temperature and heat of vaporization. In actual practice, a plate coated with cadmium has been found to operate quite satisfactorily. Other suitable materials for this coating are anthracine or a suitable plastic. It is necessary, of course, that such material be opaque to the light beam frequency. Plate 18 may be fabricated of glass having a minimum distortion across the surface thereon. The coating is generally extremely thin and may for example be in the neighborhood of 1,000 angstroms in thickness. The use of a material having a low temperature and heat of vaporization tends to minimize the power required from the laser 11 to etch the plate.

Lens 27 should be adjusted to produce as fine a beam as possible, both to concentrate the energy and to make for as fine a trace on plate 18 as possible. If so desired, a wider trace can be achieved by slight defocussing of the lens. It is to be noted that the trace scribed on plate 18 can be erased by liquifying the portions of the coating surrounding the trace. This can be achieved by defocussing the beam by means of lens 27 until the temperature of the coating is brought to the liquification point. The liquified material surrounding the trace will then flow over the trace thereby erasing it. When such erasing is done, it is preferable to orient the system so that image plate 18 is in a horizontal plane.

Figure 3:
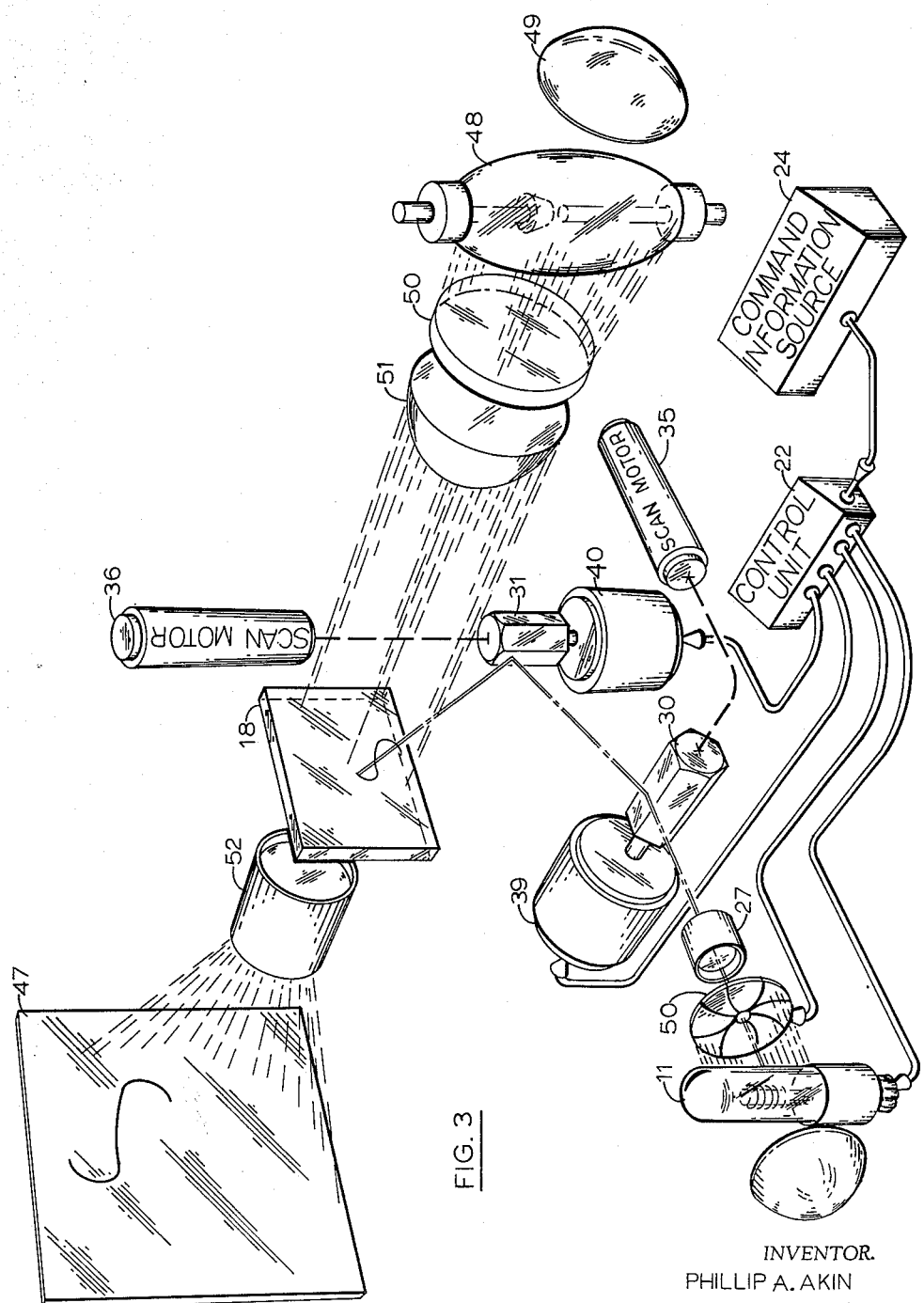
FIG. 3 is a schematic drawing illustrating a second embodiment of the device of the invention.

Referring now to FIG. 3 a second embodiment of the device of the invention is illustrated. This embodiment is similar to that shown in FIG. 2 except that the beam from source 11 in this instance provides continuous output rather than pulsed output. Beam source 11 may be a CW laser such as is commercially available from the Perkin-Elmer Company, Norwalk, Connecticut, or may be as shown in FIG. 3, a continuous high intensity energy source such as an infra-red generator. The beam impinging on image plate 18 is controlled by means of shutter 50. This shutter, such as a Kerr Cell, is momentarily opened at the instant when the outputs from position pickoffs 39 and 40 indicate coincidence of the beam position with the command signals from command information source 24, thus permitting the beam to strike image plate 18 at this time. In this fashion, a trace will be scribed on plate 18 in accordance with the command information.

Figure 4:
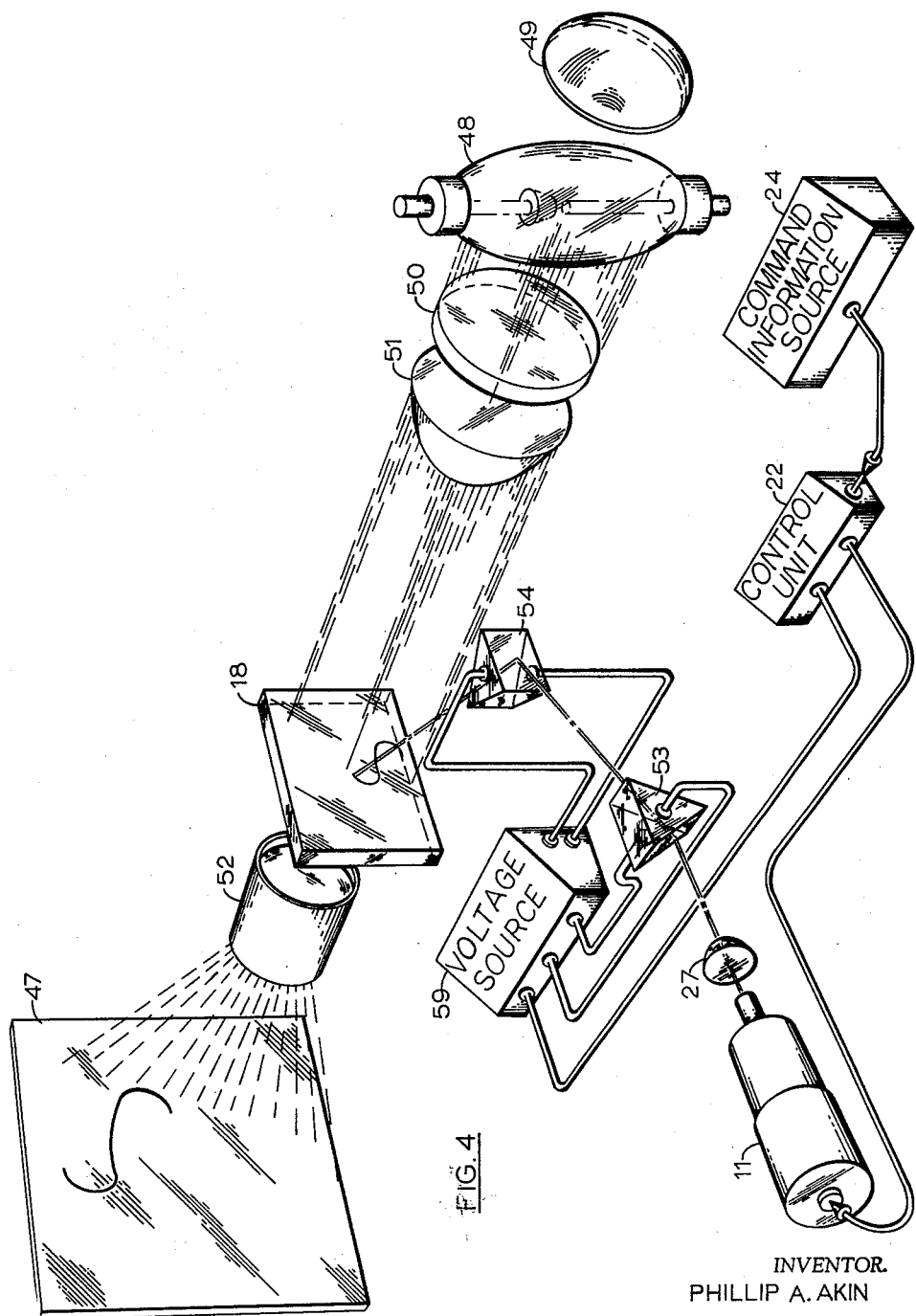
FIG. 4 is a schematic drawing illustrating a third embodiment of the device of the invention.

Referring now to FIG. 4 a second embodiment of the device of the invention is illustrated. This embodiment is generally similar in configuration to that of FIG. 2 except that in place of optical mirrors 30 and 31, piezo-electric prisms 53 and 54 are utilized and rather than using a scan system with position pickoff feedback, direct open loop control of the beam is utilized. Piezo-electric prisms 53 and 54, as is well known in the art, will vary in their refractory characteristics with the magnitude of the voltage applied thereto. Voltage source 59 is connected to control unit 22 and receives a signal therefrom which is in accordance with the output of command information source 24. A voltage of a magnitude which is determined by the output of the command information source is fed across prisms 53 and 54 from voltage source 59 which causes the beam to deflect to a position corresponding to the command position dictated by the command information source 24. As information is received from the command information source 24, control unit 22 feeds a pulse signal to laser 11 causing such laser to generate a pulse output. An image is thus scribed on image plate 47 in accordance with the command signal.

Figure 5:
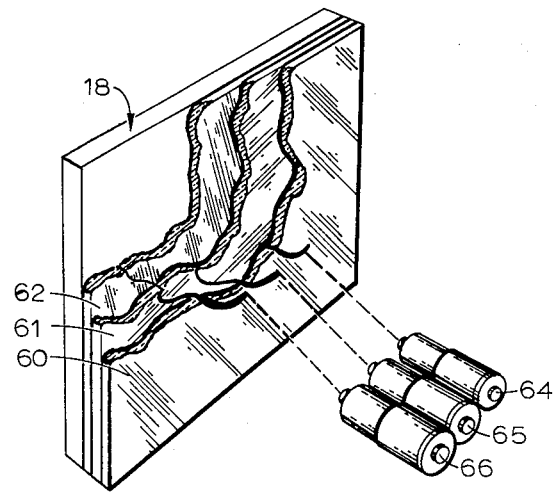
FIG. 5 is a drawing illustrating the scribing of a multicolor image plate.

A multi-color image can be produced by utilizing an image plate 18 having three separate different coatings 60, 61, and 62 thereon as shown in FIG. 5. Each of the coatings is such that it only permits certain predetermined portions of the spectrum to pass through. The wavelength of the output of laser 64 is such that layer 60 is opaque and layers 61 and 62 transparent thereto. Layer 60 will therefore be etched away by the output of laser 64. Similarly laser 65 has an output such that it will etch away layer 60 and 61, leaving layer 62, and laser 66 will etch away all three layers. The output of laser 66 will thus effectively generate a white trace, the light from the projection source passing through the bare glass plate; the output of laser 65 will generate a trace which is the color of transparent layer 62; and the output of laser 64 will generate a trace which is the color of the combination of the colors of layers 61 and 62.

Each of lasers 64, 65, and 66 is operated in conjunction with one of the systems shown in FIGS. 2–4. Thus, the outputs of several information sources can simultaneously be etched on the same image plate to form a multi-color display.

The device of this invention thus provides a simple yet highly effective technique for transcribing graphic and alpha numeric information on an image plate, such information being suitable for large scale display. The device of the invention further has high speed readout capabilities and is readily adaptable for utilization in a multi-color display.

While the invention has been described and illustrated in detail, it is clearly to be understood that this is intended by way of illustration and example only and is not to be taken by way of limitation, the spirit and scope of this invention being limited only by the terms of the following claims.

I claim:
1. An optical display device comprising
   means for generating an intense concentrated beam of energy in the frequency spectrum from ultraviolet through infra-red,
   a command signal source,
   an image plate having an opaque coating with a relatively low vaporization temperature thereon, and
   means responsive to said command signal source output for causing said light beam to impinge on said image plate,
   whereby said light beam vaporizes said coating to form images in accordance with the output of said command signal source.

2. An optical display device comprising
   means for generating an intense concentrated beam of energy in the frequency range from ultra-violet through infra-red,
   a command signal source,
   means for positioning said beam,
   means for controlling said beam in response to said command signal source, and
   an image plate having an opaque coating thereon with a relatively low vaporization temperature,
   said beam being positioned to impinge on said image plate,
   whereby said light beam vaporizes said coating to form images in accordance with the output of said command signal source.

3. The device as recited in claim 2 wherein said means for generating said intense concentrated beam is a laser.

4. The device as recited in claim 2 wherein the means for positioning said beam comprises a pair of mutually orthogonal piezo-electric prisms.

5. An optical display device comprising
laser means for generating an intense highly concentrated beam in the frequency range from ultra-violet through infra-red,
an image plate having an opaque coating thereon, said coating having a relatively low vaporization temperature,
optical means for causing said beam to impinge on said image plate,
means for driving said optical means in a predetermined scan pattern,
pickoff means for providing an output signal in accordance with the scan position of said optical means,
a command signal source, and
control means for comparing the outputs of said command signal source and said pickoff means and causing said beam to impinge on said image plate when said outputs are equal,
whereby said beam etches a pattern on said image plate in accordance with the output of said command signal source.

6. The device as recited in claim 5 wherein said optical means comprises a pair of optical mirrors, said mirrors being positioned along mutually orthogonal axes.

7. An optical display device comprising
means for generating an intense highly concentrated beam in the frequency range from ultra-violet through infra-red,
an image plate having an opaque coating thereon, said coating having a relatively low vaporization temperature,
a pair of optical mirrors interposed between said beam generating means and said image plate, said beam being reflected by said mirrors onto said plate,
motor means for rotating said optical mirrors at a predetermined speed,
pickoff means for providing an output signal in accordance with the rotation of said optical mirrors,
a command signal source, and
control means for comparing the outputs of said command signal source and said pickoff means and causing said beam to impinge on said image plate when said outputs are equal,
whereby said beam etches a pattern on said image plate in accordance with the output of said command signal source.

8. The device as recited in claim 7 wherein said means for generating an intense highly concentrated beam comprises a laser.

9. The display device as recited in claim 7 wherein said opaque coating comprises a plurality of layers, each of said layers being transparent to a predetermined portion of the spectrum from ultra-violet through infra-red.

10. An optical display device comprising
a plurality of laser means each for generating an intense highly concentrated beam at a separate predetermined wavelength in the range from ultra-violet through infra-red,
an image plate having an opaque coating thereon, said coating having a relatively low vaporization temperature, said coating having a plurality of layers, each of said layers being transparent to a predetermined one of said beams,
separate optical means for causing each of said beams to impinge on said image plate,
means for driving said optical means in a predetermined scan pattern,
separate pickoff means for providing an output signal in accordance with the scan position of each of said optical means,
a command signal source,
a control means for comparing the outputs of said command signal source and each of said pickoff means and causing said beams to impinge on said image plate when said outputs are equal,
whereby said beam etches patterns on said image plate in accordance with the output of said command signal source.

11. In an optical display device,
an image plate having an opaque coating with a relatively low vaporization temperature thereon,
a command signal source, and
means for scribing an image on said plate in accordance with the output of said command signal source, said means for scribing comprising means for generating a concentrated intense beam of energy in the frequency spectrum between ultra-violet and infra-red and means for directing said beam onto said image plate to vaporize said opaque coating in accordance with the output of said command signal source.

12. In an optical display system,
an image plate having an opaque coating with a relatively low vaporization temperature thereon,
a command signal source, and
means for vaporizing said image plate coating in accordance with the output of said command signal source,
whereby said image plate is etched in response to said command signal source.

References Cited by the Examiner
UNITED STATES PATENTS

| | | | |
|---|---|---|---|
| 2,883,257 | 4/59 | Wehe | 346—110 |
| 2,898,176 | 8/59 | McNaney | 346—110 |
| 2,922,987 | 1/60 | Haugk | 340—173 |
| 2,943,147 | 6/60 | Glenn | 346—77 |
| 3,063,331 | 11/62 | Glenn | 346—77 |
| 3,121,216 | 2/64 | Wolfe et al. | 346—77 |

LEO SMILOW, *Primary Examiner.*